United States Patent [19]

Nishino et al.

[11] 4,243,565

[45] Jan. 6, 1981

[54] AQUEOUS DISPERSION TYPE COATING COMPOSITION

[75] Inventors: Sakae Nishino, Komaki; Takao Sakakibara, Kasugai; Haruhiko Okazaki, Iwakura, all of, Japan

[73] Assignee: Dai Nippon Toryo Co., Ltd., Osaka, Japan

[21] Appl. No.: 65,753

[22] Filed: Aug. 10, 1979

Related U.S. Application Data

[63] Continuation of Ser. No. 863,147, Dec. 21, 1977, abandoned, which is a continuation of Ser. No. 670,006, Mar. 24, 1976, abandoned.

[30] Foreign Application Priority Data

Mar. 28, 1975 [JP] Japan .................................. 50-37662
Mar. 9, 1976 [JP] Japan .................................. 51-25224

[51] Int. Cl.$^3$ .......................... C08L 91/00; C09D 3/52

[52] U.S. Cl. ................. 260/22 CQ; 260/13; 260/15; 260/18 EP; 260/22 R; 260/22 CB; 260/29.2 TM; 260/29.2 EP; 260/29.2 M; 260/29.2 E; 260/29.3; 260/29.4 R; 260/29.4 UA; 260/29.6 NR; 260/29.6 RB; 260/29.6 TA; 260/29.7 NR

[58] Field of Search ................. 260/29.4 R, 29.4 UA, 260/29.2 EP, 29.2 E, 29.3, 29.6 TA, 15, 18 EP, 22 CQ, 22 CB, 29.2 N, 29.2 TN, 29.6 NR

[56] References Cited

U.S. PATENT DOCUMENTS

| | | | |
|---|---|---|---|
| 2,904,523 | 9/1959 | Hawkins, Jr. et al. | 260/29.6 MM |
| 2,994,676 | 8/1961 | Kucsan | 260/29.4 UA |
| 3,025,252 | 3/1962 | Jack | 260/29.6 MM |
| 3,244,542 | 4/1966 | Brown et al. | 260/29.6 MM |
| 3,300,428 | 1/1967 | Hans | 260/29.4 UA |
| 3,839,254 | 10/1974 | Fang | 260/29.4 UA |
| 3,926,874 | 12/1975 | Petty | 260/29.4 UA |

*Primary Examiner*—Theodore E. Pertilla
*Attorney, Agent, or Firm*—Haseltine, Lake & Waters

[57] ABSTRACT

This invention relates to an aqueous dispersion type coating composition comprising a homogeneous mixture of an aqueous medium, synthetic resin particles and a scaly aluminum pigment.

23 Claims, No Drawings

AQUEOUS DISPERSION TYPE COATING COMPOSITION

This is a continuation of Application, Ser. No. 863,147 filed Dec. 21, 1977 which is a continuation of Application Ser. No. 670,006 filed Mar. 24, 1976, both now abandoned.

Description of the prior art

In the art of paints, attempts have recently been made to prevent environmental pollution and save resources, and organic solvent dilution type paints have been replaced by water dilution type paints, powdery paints or non-solvent paints.

These new type paints have advantageous characteristics but they also have various defects. For example, powdery paints are defective or disadvantageous in that conventional coating devices for solvent type paints cannot be used, and water dilution type paints comprising a water-soluble resin have a defect in that it is difficult to obtain thick films by one coating. Further, water dilution type paints comprising a water-dispersible resin are defective in that because of the influence of dispersants, it is impossible to obtain coatings having sufficient properties.

Slurry paints having both the characteristics of the water dilution type paint and the powdery paint have recently been developed. Paints of this type comprise an aqueous medium and a particulate resin having a size of about 0.5 to about 80μ which is dispersed in the aqueous medium at a solids concentration of 20 to 70% by weight.

As the method for coating slurry paints of this type, there can be mentioned, for example, a method in which the paint is spray-coated on the surface of an article to be coated, water is evaporated and the resin component is cured to form a coating (see U.S. Pat. No. 3,787,230) and a method in which an aqueous dispersion of particles of a nylon resin is spray-coated on an article maintained at a temperature higher than 100° C. to form a coating (see U.S. Pat. No. 2,972,553). As known paints to be used for these coating methods, there can be mentioned, for example (i) a paint comprising particles of a chlorinated polyether resin having a size smaller than 200 mesh, which are dispersed in water (see U.S. Pat. No. 3,089,783), (ii) a paint comprising particles of a chlorinated polyether polymer dispersed in water containing a surfactant, an ester of a polyhydric alcohol with a lower aliphatic monocarboxylic acid, an alkaline water softener and a lower aliphatic alcohol (see U.S. Pat. No. 3,446,652), and (iii) a coating composition comprising (a) an aqueous dispersion of a polymer of an ethylenically unsaturated monomer or monomers, (b) a finely divided hydrous silicate, (c) a non-ionic surfactant and (d) a non-cellulosic thickener (see U.S. Pat. No. 3,687,885).

Further, as the aqueous dispersion type paint to be used for production of transparent paper, there is known an aqueous dispersion comprising (1) a copolymer of (a) at least one monomer selected from the group consisting of styrene, vinyl toluene, acrylamide, and acrylic and methacrylic acid alkyl esters in which the alkyl group contains from 1 to 8 carbon atoms and (b) a monomer selected from the group consisting of acrylamide, methacrylamide and formaldehyde reaction products of said amides including methyl and methoxymethyl derivatives, with (2) a water-soluble thermosetting aminoplast and (3) a volatile tertiary amine (see U.S. Pat. No. 3,235,443).

As the process for preparing these slurry paints, there are known a process comprising dissolving a resin in a water-soluble solvent, for example, an alcohol such as methanol or ethanol, a ketone such as acetone or diacetone alcohol, an ester such as ethyl butyrate or ethylene glycol monomethyl ether acetate or an ether such as ethylene glycol monoethyl ether and adding the resulting solution to water being agitated at a high speed to precipitate resin particles in water (see Japanese Patent Publication No. 52851/73) and a process comprising pulverizing a solid resin according to an ordinary pulverization method and dispersing the pulverized resin into water.

Slurry paints prepared according to these processes are characterized in that they can be applied at a solids content as high as about 40 to about 60% by weight, the coating can be accomplished by using a conventional coating apparatus for solvent dilution type paints and the volatile component contained in the paint is only water that is used as the dispersion medium. Further, since this aqueous dispersion medium contains no soluble component, saving of resources can be attained and occurrence of environmental pollution can be prevented. Because of these advantages and merits, it is expected that demands for paints of this type will increase drastically from this time on.

However, basic problems are still left unsolved in connection with these slurry paints. First of all, there can be mentioned a disadvantage that a high brilliance coating cannot be obtained by using a scaly aluminum pigment. The reason is that when a conventional powdery or slurry paint formed by kneading a scaly aluminum pigment into a vehicle and pulverizing the resulting composition is applied to an article to be coated, the scaly aluminum pigment is left in the resulting coating in the as-coated state and the number of particles of the scaly aluminum pigment arranged in parallel with the surface of the coating is much smaller than the number of the so arranged pigment particles in the coating formed from an ordinary solution type paint. More specifically, when particles of the slurry paint are applied, particles of the scaly aluminum pigment contained in the paint particles are oriented in respective directions independently of each other and are not arranged in parallel with the surface of the coating, and when the paint particles are heated and melted to form a coating film, since the flowability of the resin is low, the scaly aluminum pigment is not sufficiently arranged in parallel with the surface of the coating film.

Accordingly, in the case of a slurry paint, even if a scaly aluminum pigment is incorporated into the resin component in an amount customarily adopted in the case of an ordinary solution type paint, the brilliance of the resulting coating is low and the coating is somewhat blackish.

Further, a commercially available scaly aluminum pigment generally contains a hydrophobic additive such as mineral spirit or solvent naphtha and therefore, it cannot be dispersed in an aqueous medium as it is.

Moreover, since a scaly aluminum pigment is generally coarse, it is readily precipitated in the slurry coating composition during storage.

SUMMARY OF THE INVENTION:

This invention relates to an aqueous dispersion type coating composition comprising a homogeneous mixture of an aqueous medium, particles of a synthetic resin and a scaly aluminum pigment, which can provide a high brilliance coating.

DETAILED DESCRIPTION OF THE INVENTION:

We found that problems involved in paints of the above-mentioned type can be solved by a paint composition comprising a mixture of an aqueous medium, resin particles and a scaly aluminum pigment.

When the composition of this invention is applied to the surface of an article to be coated and water is evaporated, the scaly aluminum pigment is arranged substantially in parallel with the surfaces of the resin particles. In melt flowing of resin particles by heating, the central portion of each particle is hardly moved in general and the flowing distance in largest in the surface portion.

Accordingly, if pigment particles are present in portions of resin particles where the flowing distance is largest on melting of the resin particles by heating, the pigment particles flow together with the resin particles on heat melting and they are arranged in parallel with the surface of the coated article.

It is a primary object of the present invention to provide an aqueous dispersion type coating composition which can form a coating having a high brilliance comparable to the brilliance of a coating formed from a solution type metallic paint comprising a scaly aluminum pigment dispersed in an organic solvent solution of a synthetic resin.

A secondary object of the present invention is to provide an aqueous dispersion type coating composition into which a commercially available scaly aluminum pigment can be directly incorporated without washing.

A third object of the present invention is to provide an aqueous dispersion type coating composition in which a scaly aluminum pigment can be stably dispersed.

In accordance with this invention, there is provided a coating composition comprising (a) 90 to 30 parts by weight of an aqueous medium, (b) 10 to 70 parts by weight of resin particles having a softening point of 5° to 120° C. and an average particle size of 0.5 to 80 $\mu$ and (c) scaly aluminum pigment in an amount of 0.05 to 30% by weight based on the resin particles, and if desired (d) a water-dilutable resin in an amount of 0.5 to 30% by weight based on the resin particles.

The resin particles that are used in this invention should have a softening point of 5 to 120° C. If resin particles having a softening point lower than 5° C. are employed, when the resin particles precipitated in the aqueous medium at room temperature are agitated to restore the homogeneous state, because of the high viscosity thereof, it is impossible to sufficiently attain the finely dispersed state of the original respective particles again.

Use of a resin having a softening point higher than 120° C., is disadvantageous because the resin cannot sufficiently flow at a temperature approximating the temperature for curing the slurry paint.

Use of resin particles having a softening point of 40° to 80° C. is preferred.

As the resin constituting the resin particles that are used in this invention, there can be mentioned, for example, water-insoluble acrylic resins, epoxy resins, polyester resins, alkyd resins, amine modified resins, phenolic resins, urea resins, polyether resins, blocked isocyanate resins, cellulosic resins, melamine resins, vinyl chloride resins, vinyl acetate resins and olefinic resins.

The resin particles that are used in this invention should have an average particle size of 0.5 to 80 $\mu$. When resin particles having an average particle size smaller than 0.5 $\mu$ are used, at an ordinary solids content for the slurry paint, for example, 40 to 60% by weight, the viscosity is extremely low, and when the paint is applied at an ordinary thickness, for example, 30 to 80 $\mu$, sagging or the like is caused and defects are formed in the coating.

When the average particle size exceeds 80 $\mu$ if the paint is applied at an ordinary thickness, a uniform coating is hardly formed by heat flowing, and it is impossible to ensure a surface area sufficient to receive the scaly aluminum pigment in the resin to such an extent that the substrate can be sufficiently hidden.

Best results are obtained when resin particles having an average particle size of 1 to 30 $\mu$ are employed.

In order to obtain a practical coating thickness, it is necessary that the amount of the resin particles incorporated into the aqueous medium should be at least 10% by weight. Further, in order to facilitate agitation and uniformalization of the paint and maintain a viscosity suitable for the coating operation, it is preferred that the amount of resin particles incorporated in the aqueous medium be not larger than 70% by weight. In general, best results are obtained when the resin particles are incorporated in an amount of 30 to 50% by weight.

The resin particles that are used in the present invention may be an organic or inorganic coloring or extender pigment customarily used in the art of paints.

The scaly aluminum pigment that is used in the present invention has a flat particulate form in which the short diameter : long diameter ratio in the particles is 1 : at least 10 and the long diameter is not larger than 100$\mu$. Use of a scaly aluminum pigment satisfying the requirement of the first grade (fine particles) stipulated by Japanese Industrial Standard (JIS) K-5910, namely a particulate pigment in which the majority of particles have a size not larger than 30 $\mu$, is preferred.

As specific examples of the scaly aluminum pigment, there can be mentioned such commercially available products as Stapa 15 HK, Stapa 10 HK, Stapa Cristal Super, Stape Cristal, Stapa Mobil R 707, Stapa Mobil R 607, Stapa 15 HK n.l. and Stapa 10 HK n.l. (each being a trademark for a product manufactured and sold by Eckart-Werke A.G., West Germany), and Fine Leafing SAP 120 (a trademark for a product manufactured and sold by Shown Alumni Powder Kabushiki Kaisha).

In order to impart a high brilliance to the coating, it is necessary that the scaly aluminum pigment should be incorporated in an amount of at least 0.05% by weight based on the resin particles.

If the amount of the scaly aluminum pigment is too large, such properties as the achesion of the coating to the substrate and the flowability of the applied paint are degraded. Accordingly, the amount of the scaly aluminum pigment is controlled to a level not exceeding 30% by weight based on the resin particles.

Incorporation of the scaly aluminum pigment can easily be accomplished according to the following mixing method.

To a scaly aluminum pigment is added 0.2 to 10% by weight of a surface active agent, and water is added little by little under agitation to form a homogeneous dispersion of the pigment. The amount of water added is 20 to 200% by weight, preferably 50 to 100% by weight, based on the scaly aluminum pigment. If water is added in an amount within this range, a good dispersion can be obtained.

As the surface active agent that is used in this method, there can be mentioned ordinary anionic surface active agents such as carboxylic acids and their salts, sulfonic acids and their salts, sulfuric and sulfurous acid ester salts, phosphoric acid esters and their salts, phosphorous and phosphonic acid esters, thiophosphoric acid type surfactants, boron-containing surfactants (boric acid esters), polymer type macromolecular surfactants and polycondensate type macromolecular surfactants; nonionic surface active agents such as ether type surfactants, ester ether type surfactants, ester type surfactants and nitrogen-containing surfactants; cationic surface active agents such as aliphatic amines and their quaternary ammonium salts, aromatic amines and their quaternary ammonium salts, heterocyclic amines and their quaternary ammonium salts, polyalkylene polyamine type surfactants and macromolecular cationic surfactants; and amphoteric surfactants such as betain type surfactants and amino group-containing organic acids.

In order to prevent discoloration of the coating and obtain a coating having good properties, it is preferred that the surface active agent be incorporated in a minimum amount capable of dispersing the pigment homogeneously.

The scaly aluminum pigment that is used in the present invention is generally marketed in the form wetted with a hydrophobic additive such as mineral spirits and stearic acid.

In the present invention, in order to impart an iridescence as well as a high brilliance or metallic luster to the resulting coating, a non-metal flaky pigment such as flaky titanium dioxide, zirconium dioxide, lead carbonate, tungstate, bismuth salt, mica or fish scale may be incorporated together with the scaly aluminum pigment in an amount of 5 to 100% by weight based on the scaly aluminum pigment.

As the flaky pigment, there should be used one having fine crystals arranged in a certain direction and being capable of imparting a sufficient brilliance or pearly luster to the resulting coating. For this purpose, it is generally preferred that a non-metal flaky pigment composed of particles having a long diameter not larger than 200 $\mu$, in which the majority of the particles have a size not larger than 50 $\mu$, be used as the flaky pigment.

As examples of such preferred non-metal flaky pigment, there can be mentioned flaky titanium dioxide, zirconium dioxide, lead carbonate, tungstate, bismuth salt, mica and fish scale. More specifically, there are preferably employed Pearl Afflair.

Gold Afflair and Satin Afflair (each being a trademark for a product manufactured and sold by E. I. Du Pont de Nemours Co., U.S.A.), Mearlin-A-Pearl (a trademark for a product manufactured and sold by The Mearl Corporation, U.S.A.), Iriodin Ti 100, Iriodin Ti 100F, Iriodin Color B Ti 100, Iriodin Color G Ti 100, Iriodin Color K Ti 100, Iriodin Color Y Ti 100 and Iriodin Color DY Ti 100 (each being a trademark for a product manufactured and sold by E. Merck A. G., West Germany), and ACG, ACL, ACS, ACE, ACHB, ACHG, ACHL, ACHP, DCG, DCE, DCHB, DCHG, DCHL, DCHP, RCG, RCL, RCS, RCF, RCE, RCHB, RCHG, RCHL, RCHP, VCG, VCS-100, VCS-200, VCF, VCE, VCHB, VCHG, VCHL, VCHP, XCS-100, HCG-150, HCS-150, HCE-150, SCS-250, SCE-250, SCHB, SCHG, SCHL, SCHP, DZE-100, DZE-241, DZE-287, WZE, DBS-200, XBS-200, DBS-200 and WBS (each being a trademark for a product manufactured and sold by Nihon Koken Kogyo Co., Ltd.)

In view of the appearance and properties of the resulting coating, it is preferred that the scaly aluminum pigment or its mixture with the flaky pigment be incorporated in an amount of 0.1 to 20% by weight based on the synthetic resin particles when a metallic coating is formed by one coating. In the case of a two-coat one-bake or two-coat two-bake metallic coating this is formed by applying a colorless or colored clear paint over the metallic coating. In view of the brilliance and appearance of the resulting coating and saving of expenses, it is preferred that a metallic base paint comprising the scaly aluminum pigment or its mixture with the flaky pigment in an amount of 5 to 30% by weight based on the resin particles be employed.

For dispersing the scaly aluminum pigment to form the paint composition according to the present invention, a method comprising incorporating and dispersing the pigment into the water-dilutable resin and mixing the dispersion with the resin particles or an aqueous dispersion thereof is preferably employed.

When this method is adopted, even a commercially available scaly aluminum pigment, which is wetted with a hydrophobic additive as pointed out hereinbefore, can be stably dispersed in water without washing. The reason is believed to be that since a large quantity of a water-soluble solvent or surface active agent is contained in various starting components that are used in the present invention, for example, an aqueous solution or dispersion of the water-dilutable resin, the hydrophobic additive contained in the scaly aluminum pigment is dissolved or emulsified and absorbed in the water-dilutable resin, and the resin, the surface active agent and the like are adsorbed on the surfaces of the pigment particles to form a stable pigment dispersion.

More specifically, in case the water-dilutable resin is one capable of being rendered water-soluble in the form of a salt with a basis compound, for example, a polycarboxylic acid resin, the scaly aluminum pigment is incorporated, optionally with the flasky pigment, into a water-soluble solvent solution of the resin, whereby said hydrophobic resin is adsorbed on the surface of the pigment and the pigment is dispersed in the resin solution. Then, the resin is water-solubilized by converting the resin to a salt with a basic compound, whereby a stable pigment dispersion is obtained. In case the water-dilutable resin is a non-ionic water-soluble resin such as a polyether resin, a water-soluble melamine resin or the like, the pigment is incorporated and dispersed in an aqueous solution of the resin. According to a preferred embodiment, the pigment is incorporated and dispersed in an aqueous solution of a surface active agent, the viscosity is reduced by a water-soluble solvent according to need, and the dispersion is incorporated and dispersed into an aqueous solution of said resin, whereby a stable pigment dispersion is obtained.

In case the water-dilutable resin is an emulsion resin, by incorporating the pigment into the emulsion the pigment can easily be dispersed stably by the surface active agent contained in the emulsion.

As is apparent from the foregoing illustration, by incorporating the water-dilutable resin into the paint composition of the present invention it is possible to disperse the scaly aluminum pigment very stably and improve the storage stability of the composition. Accordingly, a paint composition comprising a water-dilutable resin in addition to the scaly aluminum pigment, the resin particles and the aqueous medium is included in the scope of the present invention. When this preferred coating composition comprising the water-dilutable resin is used, the brilliance of the resulting coating can be highly improved. The slip among the pigment particles can be improved by the presence of the water-dilutable resin, and the pigment particles are readily arranged in parallel with the surface of the coated article. Still further, the surface smoothness is improved by the water-dilutable resin.

The water-dilutable resin that is used in the present invention includes a resin customarily used for a water-soluble paint or emulsion paint and a water-soluble thickener resin. More specifically, there can be used, for example, ionic water-soluble resins such as acrylic resins, alkyd resins, polyester resins, butadiene type copolymer resins and phthalic acid resins, each having an acid value of 20 to 350, emulsion resins such as acrylic emulsion resins, polyvinyl acetate emulsion resins, vinyl acetate-acrylic copolymer emulsion resins, epoxy emulsion resins, polyester emulsion resins, polybutadiene emulsion resins, styrene-butadiene copolymer emulsion resins and polyvinyl butyral emulsion resins; hydroxyalkyl celluloses such as hydroxyethyl cellulose, hydroxypropyl cellulose and hydroxymethyl cellulose; and non-ionic water-soluble resins such as methyl cellulose, polyethylene oxide, polyvinyl alcohol, water-soluble aminoplast resins and water-soluble phenolic resins. When polyacrylic acid resins having an acid value of at least 150, hydroxyalkyl celluloses, methyl cellulose, polyethylene oxide and polyvinyl alcohol are employed as the water-dilutable resin, it is preferred that they be used in amounts no larger than 6% by weight based on the resin particles.

In general, the water-dilutable resin is added in an amount of up to 30% by weight, especially 0.5 to 30% by weight, based on the resin particles. When the amount added of the water-dilutable resin is smaller than 0.5% by weight, the storage stability of the paint and the brilliance of the coating are reduced. In contrast, if the amount of the water-dilutable resin is larger than 30% by weight, the above-mentioned inherent defects of the water-dilutable resin become conspicuous. It is generally preferred that the amount added of the water-dilutable resin be substantially the same as the amount added of the scaly aluminum pigment.

When the water-dilutable resin is incorporated in the coating composition of the present invention, the resinous composition comprising the resin particles and the water-dilutable resin may be either thermoplastic or thermosetting.

If both the water-dilutable resin and the resin particles are thermoplastic and two or more functional groups capable of reacting with one another are not contained in the resinous composition, it has thermoplastic characteristics. When at least two functional groups capable of reacting with each other are contained in the resinous composition, for example, in the case of such combinations as phenolic resin-epoxy resin, epoxy resin-melamine resin, acrylic resin-blocked isocyanate resin, acrylic resin-melamine resin, polyester resin-melamine resin, polyester resin-blocked isocyanate resin, alkyd resin-amino resin, alkyd resin-phenolic resin, epoxy resin-amino modified resin, epoxy resin-curing agent and acrylic resin-curing agent, the resinous composition has thermosetting characteristics.

In case at least two functional groups capable of reacting with each other are contained in the resinous composition, the thermosetting reaction may occur in two or more kinds of resin particles, in two or more kinds of water-dilutable resins or between the resin particles and the water-dilutable resin, or in two or more of these combination. Resin particles or water-dilutable resin having no functional group capable of causing the curing reaction may be incorporated in such combination of the resins.

The mixing ratio of the resins participating in the curing reaction may be adjusted appropriately. For example, in case a thermosetting resin composition is used as the water-dilutable resin, it is preferred that 10 to 70 parts by weight of a water-soluble aminoplast resin be combined with 100 parts by weight of at least one member selected from acrylic resins and alkyd resins having an acid value of 30 to 80. In this case, the resin particles may be thermoplastic or thermosetting.

In the case of a thermosetting resinous composition comprising a water-dilutable resin and resin particles capable of reacting with each other, it is preferred that a water-soluble aminoplast resin be used as the water-dilutable resin, particles of an acrylic resin having a hydroxyl value of 0.05 to 100, an acid value of 5 to 30 and a number average molecular weight of about 3000 to about 35000 be used as the resin particles and the aminoplast resin be incorporated in an amount of 0.5 to 100% by weight, especially 1 to 30% by weight, based on the resin particles. In this case, it is especially preferred that the resin particles comprise at least 30% by weight of the acrylic resin.

When the resin particles used are thermosetting, at least two kinds of resins capable of reacting with each other or a thermosetting resin and a curing agent may be present in the respective particles. Alternately, they may be formed into two different kinds of particles and they may be used in the form of a mixture. In this case, the water-dilutable resin may be either thermoplastic or thermosetting.

Preferred resin combinations capable of causing the curing reaction are as follows:

(i) A composition comprising an acrylic resin having a hydroxyl value of 20 to 120 and a number average molecular weight of 3000 to 35000 and a blocked isocyanate resin at a weight ratio of from 100/5 to 100/100, preferably from 100/10 to 100/50, especially preferably a composition in which the blocked isocyanate resin has an isocyanate equivalent of 100 to 2000 and the mixing ratio of the acrylic resin and the blocked isocyanate resin is such that the ratio of the number of isocyanate groups to the number of hydroxyl groups is from 0.4 to 1.2.

(ii) A composition comprising an acrylic copolymer containing 0.5 to 30% by weight of glycidyl group-containing $\alpha\beta$-ethylenically unsaturated monomer segments in the molecule and at least one member selected from dibasic acids, polybasic acids and acid anhydrides at a weight ratio of from 100/3 to 100/30, preferably from 100/5 to 100/20.

(iii) A composition comprising an acrylic copolymer containing 0.5 to 30% by weight of blocked isocyanate group-containing $\alpha,\beta$-ethylenically unsaturated monomer segments in the molecule and a polyhydric alcoholic hydroxyl group-containing compound at a weight ratio of from 100/5 to 100/100, especially preferably a composition in which the isocyanate equivalent of the blocked isocyanate group-containing copolymer is 100 to 2000 and the copolymer is mixed with the polyhydric alcoholic hydroxyl compound at such a ratio that the ratio of the number of isocyanate groups to the number of hydroxyl groups is from 0.4 to 1.2.

(iv) A composition comprising an epoxy resin having an epoxy equivalent of 400 to 500 and a softening point of 40° to 120° C. and at least one member selected from amines, polybasic acids, aminoplast resins, imidazoles, acid anhydrides, blocked isocyanates, triazoles and dicyandiamine at a weight ratio of from 100/0.5 to 100/30.

(v) A composition comprising a polyester resin having a hydroxyl value of 30 to 100 and a softening point of 20° to 120° C. and at least one member selected from acid anhydrides and blocked isocyanates at a weight ratio of from 100/5 to 100/80, especially preferably a composition in which a blocked isocyanate resin having an isocyanate equivalent of 100 to 2000 is mixed with the polyester resin at such a mixing ratio that the ratio of the number of isocyanate groups to the number of hydroxyl groups is from 0.4 to 1.2.

(vi) A composition comprising an acrylic resin having a hydroxyl value of 0.05 to 100, an acid value of 5 to 30 and a number average molecular weight of 3000 to 35000 and an aminoplast resin, preferably a methylolated product of urea, benzoguanamine or melamine, a methyl-etherified or butyl-etherified product of such methylolated product or a mixture of two or more of these condensates, at an acrylic resin/aminoplast resin mixing weight ratio of from 100/10 to 100/100, preferably from 90/10 to 50/50.

Formation of the aqueous dispersion type coating composition of the present invention may be accomplished by known mixing means. More specifically, the resin particles or an aqueous dispersion of the resin particles is incorporated in a homogeneous aqueous dispersion of the scaly aluminum pigment or a homogeneous dispersion of the water-dilutable resin-containing scaly aluminum pigment, whereby a desired aqueous dispersion type coating composition is obtained.

When the dispersion of the scaly aluminum pigment is incorporated into the dispersion of the resin particles, the pH values of both the dispersions are adjusted to substantially the same level and then they are mixed to form a dispersion.

This invention will now be described in detail by reference to the following Examples that by no means limit the scope of the invention. In these Examples, all of "part" and "%" are by weight.

EXAMPLE 1

To 94 parts of a copolymer having a softening point of about 40° C. and a number average molecular weight of about 5500, which was obtained by copolymerizing 20 parts of ethyl acrylate, 10 parts of lauryl methacrylate, 55 parts of styrene and 15 parts of glycidyl acrylate according to a customary method, 6 parts of trimellitic acid was added, and the mixture was melted and kneaded. Then, the kneaded mixture was pulverized to a size smaller than 200 mesh by means of a pulverizer. Then, 40 parts of the pulverized product was added to a homogeneous solution of 0.1 part of a non-ionic surface active agent in 60 parts of water and the mixture was agitated so that bubbling was not caused, to thereby form a homogeneous dispersion.

Separately, 50 parts of a scaly aluminum pigment, Stapa Mobil R 607, was incorporated and uniformly dispersed in 50 parts of water containing 0.5 part of an anionic surface active agent to form a solution. Then, 15 parts of the thus formed solution was incorporated into 100 parts of the above resin dispersion, and the mixture was agitated to form a homogeneous dispersion. The thus obtained paint was spray-coated on an article to be coated and heated at 200° C. for 20 minutes. A coating film having a high brilliance and a good metallic appearance was obtained.

EXAMPLE 2

A mixture of 30 parts of isobutyl methacrylate, 30 parts of 2-ethylhexyl methacrylate and 40 parts of styrene was added dropwise to a mixed solvent of 30 parts of butyl cellosolve and 30 parts of isopropyl alcohol and the polymerization was carried out according to a customary method to obtain a solution containing a resin having a softening point of about 50° C. Then, 52 parts of water was added to 48 parts of the thus obtained resin solution, and the mixture was agitated at a high speed to form a solution containing resin particles having a particle size of about 60μ. Then, 10 parts of the same scaly pigment solution as prepared in Example 1 was incorporated and uniformly dispersed in the above solution. The thus obtained paint was spray-coated on an article to be coated according to a customary spray coating method and heated at 150° C. for 30 minutes to obtain a coating film having a high brilliance and a good metallic appearance.

EXAMPLE 3

A mixture of 83 parts of an epoxy resin having an epoxy equivalent of 900 to 1000 and a softening point of 96° to 104° C. (manufactured and sold under the trademark "D.E.R. 644" by Dow Chemical Co.), 1 part of 2-phenylimidazole, 13 parts of tetrahydrophthalic anhydride and 3 parts of a copper cyanine type blue pigment was melted, kneaded and pulverized to a size smaller than 180 mesh by a pulverizer. Then, 30 parts of the above pulverized epoxy resin was uniformly dispersed into an aqueous solution of 0.1 part of a polyacrylic acid type thickener in 70 parts of water which was neutralized to a pH of 7 and had a viscosity of 5000 cps. Then, 6 parts of a solution obtained by dispersing 60 parts of "Alpaste 1100 NAL" (trademark for a scaly aluminum pigment manufactured and sold by Toyo Aluminum Kabushiki Kaisha) in 40 parts of water containing 2 parts of an anionic surface active agent was added to the above dispersion, and the mixture was agitated to render it homogeneous. The thus obtained paint was applied to an article to be coated according to a customary spray coating method and heated at 180° C. for 20 minutes to obtain a coating film having a high brilliance and a blue metallic appearance.

EXAMPLE 4

A homogeneous mixture formed by uniformly mixing and dispersing 110 parts of a 60% acetone solution of an acrylic resin having a softening point of 45° C., a molecular weight of 17000 and a hydroxyl value of 60, 50 parts of a 60% acetone solution of a blocked isocyanate resin having a softening point of 68° C. and an isocyanate equivalent of 770, 0.5 part of an organotin compound (a dissociation reaction catalyst), 0.5 part of a surface-adjusting agent (flow agent), 8 parts of Phthalocyamine Blue and 0.3 part of carbon black was sprayed into 5000 parts of water being violently agitated, to thereby emulsify the resin solution, extract the solvent into water and form resin particles. The resin particles were recovered by filtration, washed with water in an amount equal to the amount of the resin particles and filtered again, to thereby obtain a hydrous cake of the resin particles having a solids content of 60%. To 100 parts of this hydrous cake were added 0.2 part of a non-ionic surface active agent, 0.5 part of a polycarboxylic acid salt type thickener and 20 parts of water, and they were mixed to form a homogeneous composition. The composition was finely pulverized in a ball mill to obtain a slurry paint in which 70% of the resin particles had a particle size of 5 to 30μ.

Separately, a mixture of 15 parts of methacrylic acid and 15 parts of butyl methacrylate was added dropwise to an aqueous solution consisting of 65 parts of water, 2 parts of an anionic surface active agent and 3 parts of a non-ionic surface active agent and the polymerization was carried out according to a customary method to obtain an emulsion of an acrylic resin having an acid value of about 330, a glass transition temperature of about 80° C. and a number average molecular weight of about 60000, which had a solids content of 30% and a pH of 3.6. A mixture of 40 parts of a non-leafing type scaly aluminum pigment having an average particle size of 27μ and a solids content of 65% and containing mineral spirits and solvent naphtha as the volatile components (manufactured and sold under the trademark "Stapa Mobil R 207" by Asahi-Eckert Ltd.), 5 parts of a non-ionic surface active agent, 20 parts of isopropyl alcohol and 35 parts of water was added to 100 parts of the above emulsion and the aluminum pigment was homogeneously dispersed. Then, 10 parts of dimethylethanolamine was added to stabilize the dispersion state of the pigment in the emulsion. Then, 4 parts of the thus formed pigment dispersion was added to 100 parts of the above slurry paint and the mixture was agitated to obtain a homogeneous paint composition in which the resin particle/aluminum pigment/water-dilutable resin weight ratio was 100/1.01/1.15. The thus obtained paint was spray-coated on a steel plate and baked and dried at 150° C. for 30 minutes to obtain a coating film having a high brilliance and a good metallic appearance.

When this paint was placed in a sealed vessel and allowed to stand still at room temperature for 1 week, no sedimentation or coagulation of the aluminum pigment particles was observed.

EXAMPLE 5

A mixture of 83 parts of an epoxy resin having an epoxy equivalent of 450 to 525 and a softening point of 64° to 76° C. (manufactured and sold under the trademark of "Epikote 1001" by Shell Chemical Co.), 6 parts of dicyandiamine, 0.5 part of a silicone type surface-adjusting agent (flow agent), 10 parts of titanium white and 0.5 part of Phthalocyanine Blue were melt-kneaded, mechanically pulverized and sieved to obtain resin particles having a size not larger than 200 mesh. A homogeneous mixture of the thus obtained particulate resin, 0.5 part of a water-soluble thickener, 0.2 part of a non-ionic surface active agent and 50 parts of water was finely pulverized in a ball mill to obtain a slurry paint in which 85% of the resin particles had a particle size of 10 to 30μ.

Separately, 12 parts of an aliphatic hydrocarbon solvent dispersion containing 65% of a scaly aluminum pigment having a size not larger than 325 mesh (manufactured and sold under the trademark of "Alumipaste High Spakle" by Toyo Aluminum Kabushiki Kaisha) and 10.5 parts of a xylol dispersion containing 40% of a flaky pearl pigment (manufactured and sold under the trademark of "HCG 150" by Nihon Koken Kogyo Co., Ltd.) were incorporated and dispersed in 20 parts of an emulsion having a solids content of 50% and a viscosity of 3500 cps (manufactured and sold under the trademark of "Yodo Soi 32A108" by Kanebo-N.S.C. Corp. Ltd.) and 6 parts of a water-soluble aminoplant resin (manufactured and sold under the trademark of "Sumimal M-40W" by Sumitomo Chemical Co., Ltd.) and 7.5 parts of water were added to the dispersion to obtain a pigment dispersion.

Then, 200 parts of the above slurry paint were added to 56 parts of the thus formed pigment dispersion to obtain a light-blue slurry paint having a high brilliance and a good iridescence. In this paint, the weight ratio of resin particles/sum of the scaly aluminum pigment and flaky pearl pigment/water-dilutable resin was 100/12.1/14.9.

This paint was spray-coated on a steel plate and baked and dried at 180° C. for 20 minutes to obtain a coating film having a high brilliance and a good iridescence. When the storage stability of the paint was tested in the same manner as in Example 4, neither the scaly aluminum pigment nor the flaky pigment sedimented or coagulated.

EXAMPLE 6

To 50 parts of a clear powdery paint composed of a thermoplastic polyester resin having a softening point of about 90° C. (manufactured and sold under the trademark "VPET 1360" by Dainippon Toryo Kabushiki Kaisha) were added 50 parts of water and 0.3 parts of a surface active agent (flow agent: manufactured and sold under the trademark "Aerosil OT" by American Cyanamid Company), and the mixture was kneaded and pulverized in a ball mill to obtain a slurry paint in which 80% of the resin particles had a size of 20 to 50μ.

Separately, in a nitrogen gas current, 40 parts of an epoxy resin (manufactured and sold under the trademark "Epikote 828" by Shell Chemical Co.) and 100 parts of linseed oil fatty acid were heated and agitated at 230° C. for 3 hours to form an epoxy resin ester having an acid value of 10. Then, 20 parts of maleic anhydride was added to the epoxy resin ester and the mixture was heated and agitated at 180° C. for 4 hours to obtain a maleic acid-modified epoxy resin having an acid value of 140, and 100 parts of isopropyl alcohol was added to the resin to dissolve it. To 10 parts of the thus formed resin solution was added 10 parts of a scaly aluminum pigment powder (manufactured and sold under the trademark "LAC KT Lining" by Asahi Eckart Ltd.), and 1.5 parts of diethanol amine and 4 parts of water were added to the above mixture to form a homogeneous pigment dispersion. Then, this dispersion was mixed with 200 parts of the above slurry paint to obtain a paint composition in which the resin particle/scaly aluminum pigment/water-dilutable resin weight ratio was 100/10/6.

The thus obtained paint was spray-coated on a steel plate and maintained at 150° C. for 20 minutes to obtain a coating film having a good silver metallic luster. When this paint was tested in the same manner as in Example 4, it was found that the paint had a very excellent storage stability.

EXAMPLE 7

A homogeneous solution was prepared by mixing under agitation 110 parts of the same acrylic resin solution in acetone as used in Example 4 (the resin content being 60%), 50 parts of the same blocking isocyanate resin solution in acetone as used in Example 4 (the resin content being 60%), 0.5 part of an organotin compound and 0.5 part of a surface-adjusting agent (flow agent), and in the same manner as in Example 4, the solution was sprayed in 5000 parts of water being agitated. The thus formed resin particles were recovered by filtration, washed with water and filtered again to form a hydrous cake of the resin particles having a solids content of 60%. Then, 0.2 part of a non-ionic surface active agent, 0.5 part of a polycarboxylic acid salt type thickener and 20 parts of water were homogeneously incorporated into 100 parts of the thus formed hydrous cake, and the resulting homogeneous mixture was finely pulverized to obtain a slurry paint in which 85% of the resin particles had a particle size of 1 to 30μ.

Separately, 3.6 parts of diethanolamine and 47.4 parts of water were homogeneously incorporated and dispersed in 14 parts of the same scaly aluminum pigment powder as used in Example 6 ("LAC TK Lining") and 24 parts of th same maloic acid-modified epoxy resin solution in isopropyl alcohol as used in Example 6, to thereby obtain a pigment dispersion. Then, 89 parts of this pigment dispersion was homogeneously mixed with 100 parts of the above slurry paint to form a base paint. In this base paint, the resin particle/aluminum pigment/water/dilutable resin weight ratio was 100/28.2/28.8. This base paint was spray-coated in a thickness of 30μ on a steel plate, and was set until the coating was dry to the touch. Then, the above slurry paint was further spray-coated on the thus formed coating and baked and dried at 150°

C. for 30 minutes to obtain a coating having a good silver metallic luster.

When the above base paint was placed in a sealed vessel and the storage stability was tested in the same manner as in Example 4, no sedimentation or coagulation of the aluminum pigment particles was observed.

EXAMPLE 8

A solution paint prepared by homogeneously mixing and dispersing 56 parts of a 60% acetonesolution of an acrylic resin having a softening temperature of 41° C., a molecular weight of 15000, a hydroxyl value of 40 and an acid value of 18, 24 parts of a 60% acetone solution of a melamine resin (manufactured and sold under the trademark "Resimene RF-3403" by Monsanto Corp.), 5 parts of a 20% acetone solution of cellulose acetate butyrate (manufactured and sold under the trademark "EAB-551-02" by Eastman Kodak Co.), 8 parts of a 20% acetone solution of dimethyl phthalate (a plasticizer manufactured and sold under the trademark "D.M.P." by Shinnihonrika Kabushiki Kaisha), 0.5 part of a silicone type surface-adjusting agent (flow agent), 0.5 parts of carbon black and 6 parts of Phthalocyanine Green. In the same manner as in Example 4, this solution was sprayed in water to form resin particles in water. The resin particles were washed with water and separated by centrifugal separation to obtain a hydrous cake of the resin particles having a solids content of 65%. Then, 0.2 part of a non-ionic surface active agent, 0.4 part of a thickener (manufactured and sold under the trademark "Organite A" by Hojun Yoko Corp.) and 35 parts of water were added to 100 parts of the hydrous cake, and they were mixed homogeneously and finely pulverized in a ball mill to obtain a slurry paint in which 75% of the resin particles had a particle size of 4 to 30μ.

Separately, 40 parts of a water-dispersbile scaly aluminum pigment (manufactured and sold under the trademark "Water Dispersible Standard Non-Leafing 1500MA" by Toyo ALuminum Kabushiki Kaisha; solids content=70%) was homogeneously dispersed into a mixed resin solution composed of 48 parts of a water-soluble alkyd resin (manufactured and sold under the trademark "Water Sol s-123" by Japan Reichhold Chemical Inc.; solids content=50%) and 12 parts of a water-soluble melamine resin (manufactured and sold under the trademark "Water Sol S-165" by Japan Reichhold Chemical Inc.; solids content=66%) to obtain a pigment dispersion. Then, 25 parts of the thus obtained pigment dispersion was incorporated in 136 parts of the above slurry paint, and the mixture was agitated to obtain a paint composition in which the resin particle/aluminum pigment/water-dilutable resin weight ratio was 100/10.77/12.28.

The thus obtained paint was spray-coated on a steel plate and baked and dried at 160° C. for 30 minutes to obtain a coating film having a good metallic appearance.

When the paint was charged in a sealed vessel and allowed to stand still at room temperature for 1 week, no sedimentation or coagulation of the aluminum pigment particles was observed.

EXAMPLE 9

In 67 parts of acetone, 50 parts of methyl methacrylate, 19.7 parts of hydroxypropyl methacrylate, 28.3 parts of 2-ethylhexyl methacrylate and 2 parts of acrylic acid were subjected to solution polymerization according to a customary method to obtain a solution of an acrylic resin having a hydroxyl value of 76.5, an acid value of 15, a molecular weight of 17000 and a softening point of 50° C., which had a non-volatile content of 60%. To 80 parts of this acrylic resin solution were added 0.5 part of a fluorine type surface-adjusting agent (flow agent) and 15 parts of a 20% acetone solution of a plasticizer (the above-mentioned D.M.P.), and 5 parts of a red pigment (manufactured and sold under the trademark "Paliogen Red GG" by Badische Anilin & Fabrik A.G., West Germany) was kneaded with and dispersed in the above mixture to obtain a red solution paint. This red solution paint was sprayed in water in the same manner as in Example 4 to form resin particles, and the resin particles were washed with water and subjected to centrifugal separation to obtain a hydrous cake of the resin particles having a solids content of 60%. To 100 parts of this hydrous cake were added 0.6 part of a polymeric non-ionic surface active agent, 0.4 part of a thickener (manufactured and sold under the trademark "Bengel" by Hojun Yoko Corp., Ltd.) and 19 parts of water, and the mixture was agitated to form a homogeneous composition and it was finely pulverized by a shaking mill to obtain a slurry paint in which 85% of the resin particles had a particle size of 0.5 to 10μ.

Separately, 9 parts of a flaky aluminum pigment (manufactured and sold under the trademark "Ruby Series AS #5 Bright Red" by Fukuda Kinzoku Hakufun Kogyo Kabushiki Kaisha) and 1 part of a flaky aluminum pigment (manufactured and sold under the trademark of "Ruby Series AS #20 Nile Green" by Fukuda Kinzoku Hakufun Kogyo Kabushiki Kaisha) were dispersed in a solution of 10 parts of a water-soluble aminoplast resin (manufactured and sold under the trademark of "Sumitex Resin M-3" by Sumitomo Chemical Co., Ltd.; solids content=80%) in 10 parts of water, and the resulting solution was incorporated and dispersed homogeneously into 120 parts of the above slurry paint to obtain a paint composition in which the resin particle/flaky aluminum pigment/water-dilutable resin weight ratio was 100/16.67/13.33. This paint composition was applied to a white paint-undercoated article and baked and cured at 150° C. for 30 minutes to obtain a coating film having a high sparkling effect. In this coating film, the curing reaction was caused between the acrylic resin particles and the water-dilutable aminoplast resin, and therefore, the coating film was excellent in such properties as solvent resistance and water resistance.

When this paint composition was placed in a sealed vessel and allowed to stand still at room temperature for 1 week in the same manner as in Example 4, no sedimentation or coagulation of aluminum pigment particles was observed.

EXAMPLE 10

In 67 parts of acetone, 17.1 parts of glycidyl methacrylate, 8.5 parts of hydroxypropyl methacrylate, 10.4 parts of methyl methacrylate, 45.5 parts of styrene, 7.9 parts of isobutyl methacrylate and 10.6 parts of ethyl methacrylate were subjected to solution polymerization according to a customary method to obtain an acrylic resin having a glass transition temperature of 65° C. Then, 20 parts of sebacic acid, 0.5 part of a surface-adjusting agent (flow agent), 8 parts of Phthalocyanine Blue and 0.3 part of carbon black were dispersed in 133 parts of the above acrylic resin. In the same manner as in Example 4, the dispersion was sprayed in water to form resin particles. The resin particles were washed with water and subjected to centrifugal separation to obtain a hydrous cake of the resin particles having a solids content of 65%.

To 77 parts of this hydrous cake were added 0.5 part of a thickener, 0.2 part of a non-ionic surface active agent and 23 parts of water, and the mixture was agitated to form a homogeneous composition. The composition was finely pulverized in a ball mill to obtain a slurry pigment in which 90% of the resin particles had a particle size of 1 to 35μ.

Separately, 12 parts of an aliphatic hydrocarbon solvent dispersion containing 65% of a scaly aluminum pigment having a size not larger than 325 mesh (manufactured and sold under the trademark "Alumipaste High Spakle" by Toyo Aluminium Kabushiki Kaisha) and 10.5 parts of a xylol dispersion containing 40% of a flaky pearl pigment (manufactured and sold under the trademark "HCG 150" by Nihon Koken Kogyo Co., Ltd.) were incorporated and dispersed in 20 parts of an emulsion having a solids content of 50% and a viscosity of 3500 cps (manufactured and sold under the trademark "Yodo Sol 32A18" by Kanebo-N.S.C.), and 6 parts of a water-soluble aminoplast resin (manufactured and sold under the trademark "Sumimal M-40W" by Sumitomo Chemical Co., Ltd.) and 7.5 parts of water were added to the resulting dispersion to obtain a pigment dispersion.

Then, 200 parts of the above slurry paint was added to 56 parts of this pigment dispersion to obtain a light-blue slurry paint having a high brilliance and a good iridescence, in which the resin particle/sum of the scaly aluminum pigment and the flaky pearl pigment/water-dilutable resin weight ratio was 100/12.1/14.9.

This paint was spray-coated on a steel plate and baked and dried at 180° C. for 20 minutes to obtain a coating film having a high brilliance and a good iridescence.

When the storage stability of the paint was tested in the same manner as in Example 4, no sedimentation or coagulation of the particles of the scaly aluminum pigment and the flaky pigment was observed.

What is claimed is:

1. A heat curable aqueous dispersion coating composition comprising (a) 90 to 30 parts by weight of an aqueous medium, (b) 10 to 70 parts by weight of water-insoluble synthetic resin particles having a softening point of 5° to 120° C. and an average particle size of 1 to 30μ and (c) separate particles of a scaly aluminum pigment in which the short diameter: long diameter ratio in the particles is 1: at least 10 and the long diameter is not larger than 100μ, in an amount of 0.05 to 30% by weight based on the resin particles said resin particles being selected from (1) a mixture in the respective particles of at least two types of synthetic resins capable of reacting with each other upon heating or (2) a mixture in the respective particles of a synthetic resin and a curing agent for said resin, capable of causing curing of said resin upon heating.

2. A coating composition as set forth in claim 1 wherein the component (c) is 0.1 to 30% by weight, based on the resin particles, of a mixture of a scaly aluminum pigment in which the short diameter: long diameter ratio in the particles is 1: at least 10 and the long diameter is not larger than 100μ, and a flaky pigment and the amount of the flaky pigment is 5 to 100% by weight based on the scaly aluminum pigment.

3. A coating composition as set forth in claim 1 wherein the component (b) is a mixture of an acrylic resin having a hydroxyl value of 20 to 120 and a number average molecular weight of 3000 to 35000 and a blocked isocyanate resin, the acrylic resin/blocked isocyanate resin weight ratio being from 100/5 to 100/100.

4. A coating composition as set forth in claim 1 wherein the component (b) is a mixture of an acrylic resin having a hydroxyl value of 0.05 to 100, and acid value of 5 to 30 and a number average molecular weight of 3000 to 35000 and an aminoplast resin, the acrylic resin/aminoplast resin weight ratio being from 100/10 to 100/100.

5. A coating composition as set forth in claim 1 wherein the component (b) is a combination of an acrylic copolymer containing 0.5 to 30% by weight of glycidyl group-containing α,β-ethylenically unsaturated monomer segments in the molecule and at least one member selected from dibasic acids, polybasic acids and acid anhydrides, the copolymer/acid weight ratio being from 100/3 to 100/30.

6. A coating composition as set forth in claim 1 wherein the component (b) is a combination of an acrylic copolymer containing 0.5 to 30% by weight of blocked isocyanate group-containing α,β-ethylenically unsaturated monomer segments in the molecule and a polyhydric alcoholic hydroxyl group-containing compound, the copolymer/polyhydric alcoholic hydroxyl group-containing compound weight ratio being from 100/5 to 100/100.

7. A coating composition as set forth in claim 1 wherein the component (b) is a combination of an epoxy resin having an epoxy equivalent of 400 to 5000 and a softening point of 40° to 120° C. and at least one member selected from amines, polybasic acids, aminoplast resins, imidazoles, acid anhydrides, blocked isocyanates, triazoles and dicyandiamine, the mixing weight ratio of the two components being from 100/0.5 to 100/30.

8. A coating composition as set forth in claim 1 wherein the component (b) is a combination of a polyester resin having a hydroxyl value of 30 to 100 and a softening point of 20° to 120° C. and at least one member selected from acid anhydrides and blocked isocyanates, the mixing weight ratio of the two components being from 100/5 to 100/80.

9. A coating composition as set forth in claim 1 wherein the component (b) comprises resin particles containing 30 to 100% by weight of an acrylic copolymer containing 0.5 to 30% by weight of glycidyl group-containing $\alpha,\beta$-ethylenically unsaturated monomer segments in the molecule and resin particles containing 30 to 100% by weight of a carboxyl group-containing acrylic copolymer containing 0.5 to 30% by weight of segments of at least one monomer selected from acrylic acid, methacrylic acid, itaconic acid, crotonic acid and maleic anhydride, the glycidyl group-containing acrylic copolymer/carboxyl group-containing acrylic copolymer weight ratio being from 99/1 to 1/99.

10. A coating composition as set forth in claim 4 wherein the aminoplast resin is at least one member selected from methylolated products of urea, benzoguanamine and melamines, methyl-esterified and butyletherified products of said methylolated products, and condensates thereof, and the acrylic resin/aminoplast resin weight ratio is from 90/10 to 50/50.

11. A heat curable aqueous dispersion coating composition comprising (a) 90 to 30 parts by weight of an aqueous medium, (b) 10 to 70 parts of water-insoluble synthetic resin particles having a softening point of 5° to 120° C. and an average particle size of 1 to 30$\mu$, (c) separate particles of a scaly aluminum pigment in which the short diameter: long diameter ratio in the particles is 1: at least 10 and the long diameter is not larger than 100$\mu$, in an amount of 0.05 to 30% by weight based on the resin particles and (d) a water-dilutable resin in an amount of up to 30% by weight based on the resin particles, said resin particles being selected from (1) a mixture in the respective particles of at least two types of synthetic resins capable of reacting with each other upon heating or (2) a mixture in the respective particles of a synthetic resin and a curing agent for said resin capable of causing curing of said resin upon heating.

12. A coating composition as set forth in claim 11 wherein the component (c) is 0.1 to 30% by weight, based on the resin particles, of a mixture of a scaly aluminum pigment and a flaky pigment and the amount of the flaky pigment is 5 to 100% by weight based on the scaly aluminum pigment.

13. A coating composition as set forth in claim 11 wherein the component (d) is an acrylic resin having an acid value of 30 to 80 and/or an alkyd resin with a water-soluble aminoplast resin, the mixing weight ratio as the solids of the acrylic and/or alkyd resin/aminoplast resin components being from 100/10 to 100/70.

14. A coating composition as set forth in claim 11 wherein the component (b) is a mixture of an acrylic resin having a hydroxyl value of 20 to 120 and a number average molecular weight of 3000 to 35000 and a blocked isocyanate resin, the acrylic resin/blocked isocyanate resin weight ratio being from 100/5 to 100/100.

15. A coating composition as set forth in claim 11 wherein the component (b) is a mixture of an acrylic resin having a hydroxyl value of 0.05 to 100, an acid value of 5 to 30 and a number average molecular weight of 3000 to 35000 and an aminoplast resin, the acrylic resin/aminoplast resin weight ratio being from 100/10 to 100/100.

16. A coating composition as set forth in claim 11 wherein in the component (b) is a combination of an acrylic copolymer containing 0.5 to 30% by weight of glycidyl group-containing $\alpha,\beta$-ethylenically unsaturated monomer segments in the molecule and at least one member selected from dibasic acids, polybasic acids and acid anhydrides, the acrylic copolymer/acid weight ratio being from 100/3 to 100/30.

17. A coating composition as set forth in claim 11 wherein the component (b) is a combination of an acrylic copolymer containing 0.5 to 30% by weight of blocked isocyanate group-containing $\alpha,\beta$-ethylenically unsaturated monomer segments in the molecule and a polyhydric alcoholic hydroxyl group-containing compound, the acrylic copolymer/polyhydric alcoholic hydroxyl group-containing compound weight ratio being from 100/5 to 100/100.

18. A coating composition as set forth in claim 12 wherein the component (b) is a combination of an epoxy resin having an epoxy equivalent of 400 to 5000 and a softening point of 40° to 120° C. and at least one member selected from amines, polybasic acids, aminoplast resins, imidazoles, acid anhydrides, blocked isocyanates, triazoles and dicyandiamine, the mixing weight ratio of the two components being from 100/0.5 to 100/30.

19. A coating composition as set forth in claim 12 wherein the component (b) is a combination of a polyester resin having a hydroxyl value of 30 to 100 and a softening point of 20° to 120° C. and at least one member selected from acid anhydrides and blocked isocyanates, the mixing weight ratio of the two components being from 100/5 to 100/80.

20. A coating composition as set forth in claim 11 wherein the component (b) contains 30 to 100% by weight of an acrylic resin having a hydroxyl value of 0.5 to 100, an acid value of 5 to 30 and a number average molecular weight of 3000 to 35000 and the component (d) is a water-soluble aminoplast resin, the acrylic resin/water-soluble aminoplast resin weight ratio being from 100/0.5 to 100/100.

21. A coating composition as set forth in claim 11 wherein the component (b) comprises resin particles containing 30 to 100% by weight of an acrylic copolymer containing 0.5 to 30% by weight of glycidyl group-containing $\alpha,\beta$-ethylenically unsaturated monomer segments in the molecule and resin particles containing 30 to 100% by weight of a carboxyl group-containing acrylic copolymer containing 0.5 to 30% by weight of segments of at least one monomer selected from acrylic acid, methacrylic acid, itaconic acid, crotonic acid and maleic anhydride in the molecule, the glycidyl group-containing acrylic copolymer/carboxyl group-containing acrylic copolymer weight ratio being from 99/1 to 1/99.

22. A coating composition as set forth in claim 11 wherein the isocyanate equivalent of the blocked isocyanate resin is 100 to 2000 and the mixing ratio of the blocked isocyanate resin and the acrylic resin is such that the ratio of the number of isocyanate groups to the number of hydroxyl group is from 0.4 to 1.2.

23. A coating composition as set forth in claim 19 wherein the blocked isocyanate is a blocked isocyanate resin having an isocyanate equivalent of 100 to 2000 and the mixing ratio of the blocked polyisocyanate resin and the polyester resin is such that the ratio of the number of isocyanate groups to the number of hydroxyl group is from 0.4 to 1.2.

* * * * *